UNITED STATES PATENT OFFICE.

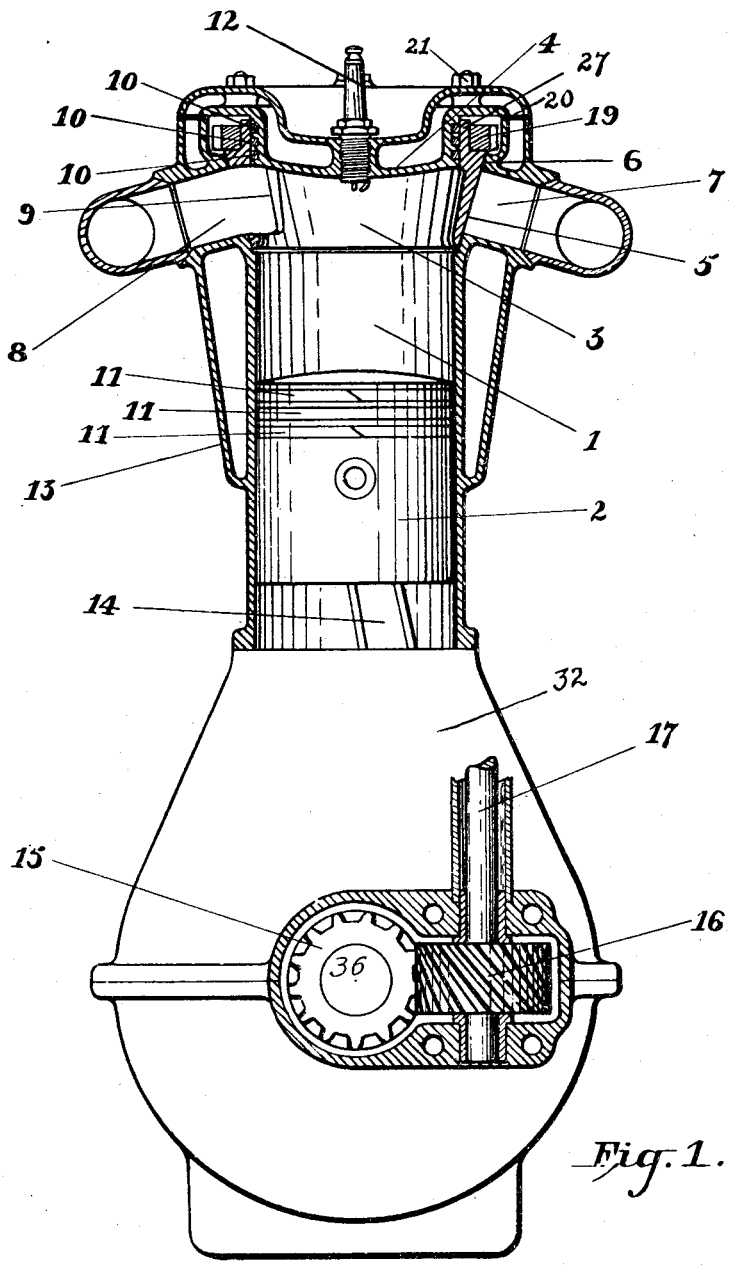

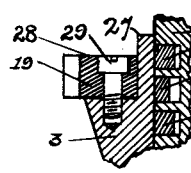 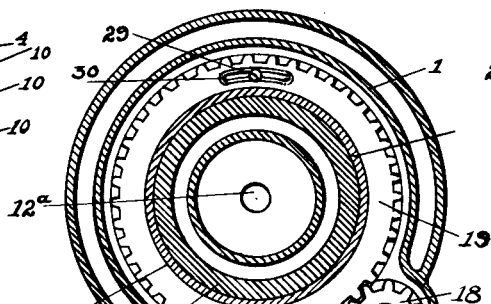 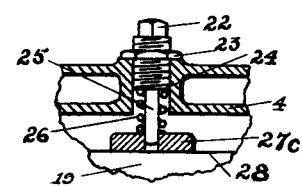
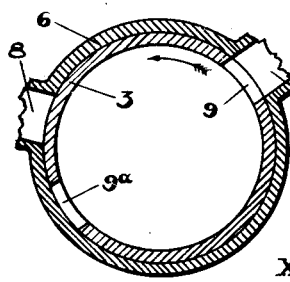 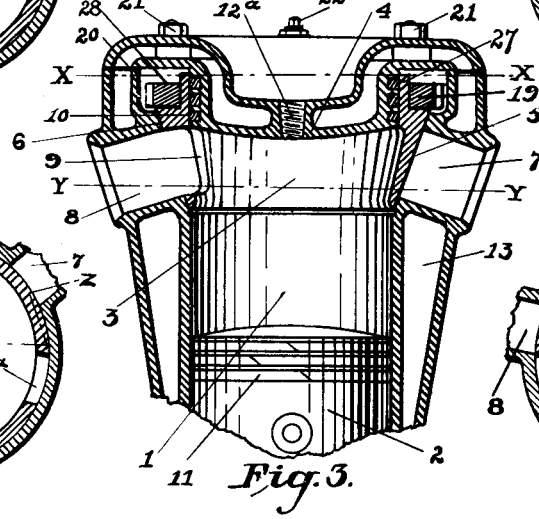 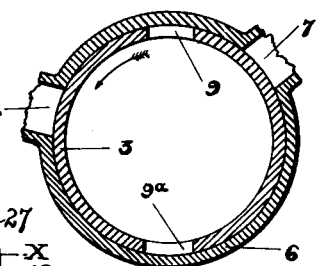
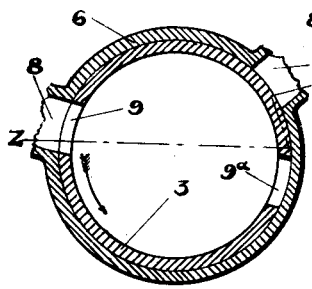 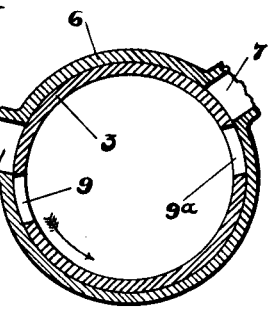
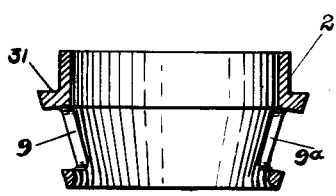 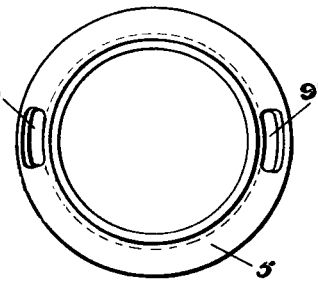 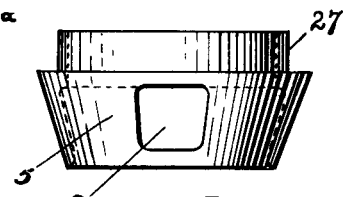

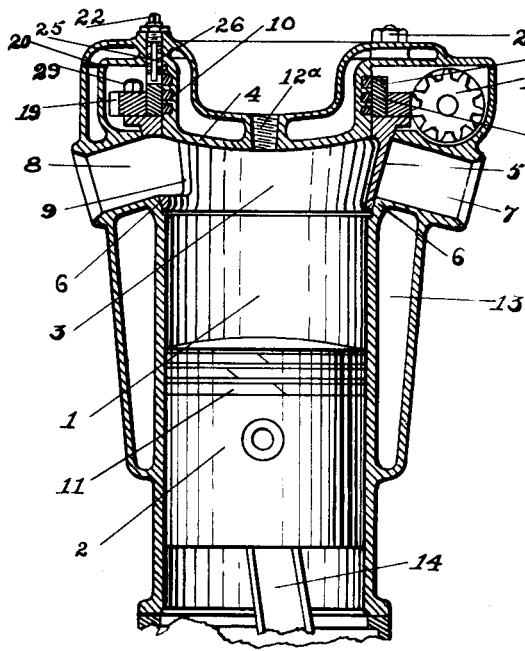
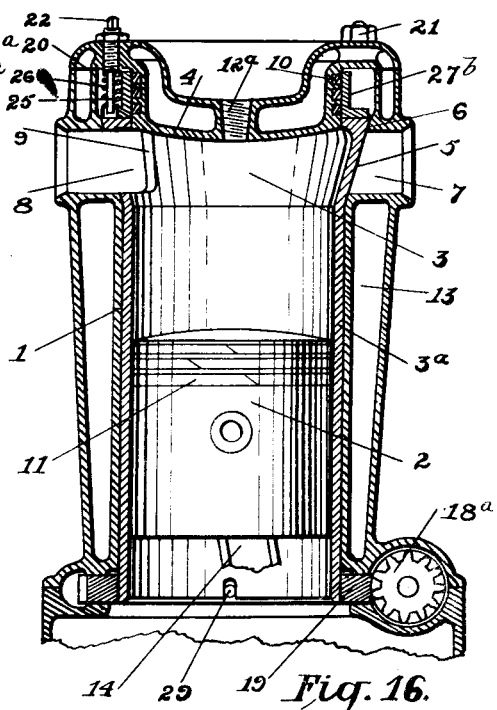
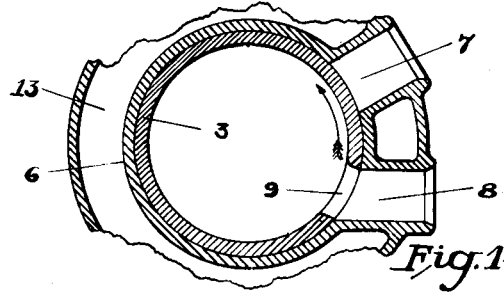
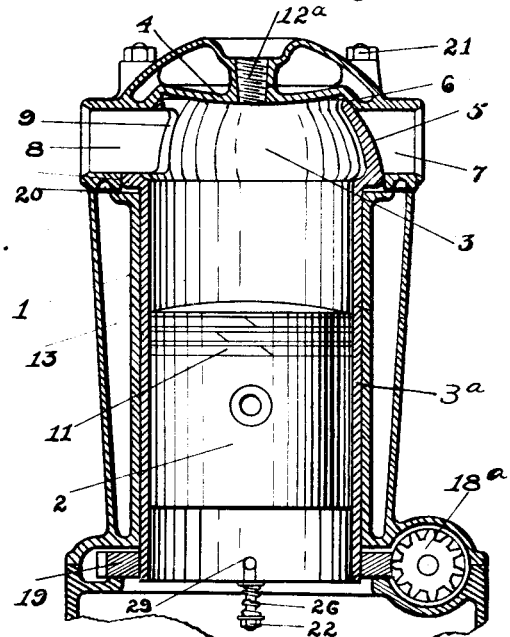
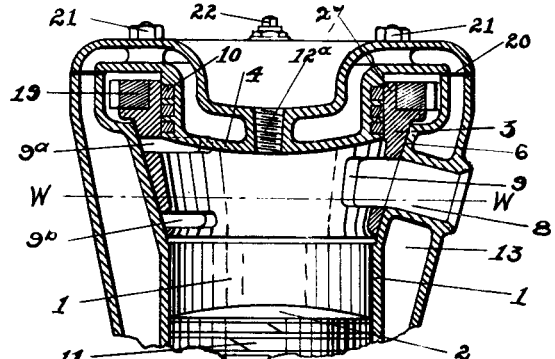

RALPH H. HEBERLING, OF OSHKOSH, WISCONSIN.

VALVE FOR INTERNAL-COMBUSTION ENGINES.

1,193,142.   Specification of Letters Patent.   Patented Aug. 1, 1916.

Application filed April 9, 1914. Serial No. 830,759.

*To all whom it may concern:*

Be it known that I, RALPH H. HEBERLING, a citizen of the United States, residing at Oshkosh, in the county of Winnebago and State of Wisconsin, have invented or discovered certain new and useful Improvements in Valves and Valve Mechanisms for Internal-Combustion Engines, of which the following is a specification, reference being had therein to the accompanying drawings.

This invention relates to a valve mechanism for internal combustion engines, and has for its object to provide a simple and efficient valve mechanism comprising a rotary valve which is so constructed and mounted that it may expand in its seat when heated, without binding, so that no injury may occur owing to expansion of the valve due to heat, as also to provide a balanced valve construction.

In the accompanying drawings, in which like reference numerals denote like parts, Figure 1 is an elevation, partly in vertical section, showing part of an internal combustion engine embodying the present invention. Fig. 2 is a horizontal section on line X—X, Fig. 3, looking down, and Fig. 3 is a view similar to the upper part of Fig. 1. Fig. 4 is a detail view of the valve, looking from the bottom thereof. Fig. 5 is a detail vertical section of the valve, and Fig. 6 a detail elevation thereof. Fig. 7 is a fragmentary vertical section, on an enlarged scale, to show the connection between the valve and its gear ring. Fig. 8 is a fragmentary section to show one of the pressure devices by which the tapering valve is held yieldingly to its seat. Figs. 9, 10, 11 and 12 are horizontal sections, on line Y—Y, Fig. 3, of the rotary valve and the encircling casing forming the valve seat, these different views showing the valve in different positions. Figs. 13, 15, 16 and 17 are vertical sections showing slight modifications of the construction shown in Figs. 1 and 3, and Fig. 14 is a horizontal section on line W—W of Fig. 15.

Referring to the drawings, the engine cylinder 1 is supported by or formed integral with a frame or casing 32 in which is journaled the crank shaft 36 connected by a pitman 14 with a piston 2 working in the cylinder 1 and provided, as is usual, with packing rings 11. An upward continuation 6 of the cylinder 1 affords a seat for the rotary valve 3, said seat being of tapering or conical form, and the said valve being of similar construction, as more clearly shown in Fig. 6, to fit the said seat. The valve casing is provided with an inlet passage 7 and an exhaust passage 8, and the valve is provided with inlet and exhaust ports 9 and 9ª, said ports being preferably diametrically opposite each other and of equal area. These ports serve alternately as inlet and exhaust ports as the valve rotates, as will be understood.

The crank shaft 36 carries a gear 15 meshing with a gear 16 at the lower end of a vertical shaft 17 which is provided at its upper end with a gear 18 meshing with a gear ring 19 secured by screws or bolts 29 to a flange 31 on the rotary valve 3, the said screws or bolts 29 passing through slots 30 in the said gear ring, thereby affording an adjustable connection between said gear ring and the said valve, for convenience in securing a proper timing. The cylinder 1 is encircled by a water jacket 13 which may be extended upward so as to surround the valve seat 6 excepting at the inlet and outlet passages 7 and 8, so that the valve may be properly cooled; or, if preferred, the valve may be cooled by air circulation.

The cylinder head 4 is provided with packing rings 10 interposed between said cylinder head and an upwardly extending flange portion 27 on the valve 3; and fixed in the seat 12ª in the said cylinder head 4 is a sparking plug 12. The said cylinder head is secured to the valve casing by means of bolts 21, and a packing ring may be interposed between said cylinder and said casing to make a tight fit.

To hold the valve 3 yieldingly to its seat while permitting it to rotate freely and to expand under the influence of heat, one or more pressure devices are preferably employed. As shown more clearly in Fig. 8, each of these pressure devices may consist of an adjustable pin 25 having a threaded portion tapped in the cylinder head 4 and having a shoulder 24 between which and a pressure plate or button 27ᶜ is interposed a spring 26, the pressure plate or button resting on the upper surface 28 of the gear ring 19. The upper end 22 of the said pin 25 is of polygonal form so as to be adapted to receive a wrench by which the said pin may be turned to vary the tension of the spring 26, and the said pin may be retained in any desired position of adjustment by a lock nut 23.

From the foregoing it will be understood that the valve 3 will be properly rotated from the crank shaft of the engine and that owing to its tapering or conical construction and also owing to the fact that it is yieldingly held to its seat it will be free to expand under the influence of heat without danger of binding in its seat 6.

In the modifications shown in Figs. 13 and 16 the parts 27ª and 27ᵇ, on which the pressure device or devices comprising the spring or springs 26, to hold the valves yieldingly to their seats, bear, are separate from the valves 3, so that these parts 27ª and 27ᵇ need not rotate with the valves, as in the construction shown in Figs. 1, 2 and 3 where the flange 27 is shown as being formed integral with the valve 3. Also in the modifications shown in Figs. 13, 16 and 17 the gears 18ª, by which the valve gears are rotated, and which are operated from the crank shaft of the machine, are differently arranged than in the construction shown in Figs. 1, 2 and 3. Also in the modifications shown in Figs. 16 and 17 the valves 3 are formed integral with sleeves 3ª, which extend to the bottom of the cylinders 1, and are provided at their lower ends with gear rings 19 meshing with the driving gears 18ª. In these constructions the gear rings are secured to the sleeves 3ª by means of radial pins or bolts 29. In the modification shown in Fig. 17 the valve 3 tapers upwardly, instead of downwardly, as in the other views, and is of curved form so as to have a convex outer surface fitting a vertically concave valve seat; and in this form of the invention the pressure device, including the spring 26, is arranged to act on the bottom of said sleeve and thus press the valve yieldingly upward to its seat.

In the modification shown in Figs. 14 and 15 the valve 3 is designed to run at half crank shaft speed, and this valve is provided with two ports 9ª and 9ᵇ which are staggered with relation to the inlet and exhaust passages 7 and 8 and which serve only to balance port 9 which alone coöperates with the inlet and exhaust passages 7 and 8.

In all of these different modifications of the invention, however, the rotary valves are formed tapering and rest yieldingly on or are held yieldingly to their seats, and are thus capable of adjusting themselves automatically so that they will not bind in their seats when heated. Also in the different forms of the invention shown the valve, in each instance, consists of a ring or annulus open at top and bottom and provided with side inlet and exhaust ports of equal area, and having a downwardly or upwardly tapering vertical outer face 5. The improved valve is thus substantially in a state of equilibrium, or is properly balanced both laterally and longitudinally, so that it will run with a minimum of friction. The lateral pressures are substantially balanced because the lateral ports in the wall of the valve are diametrically opposite and are of equal area, and the longitudinal pressures are substantially balanced by virtue of the fact that the valve is open at top and bottom, and is so constructed that the opening at the larger end of the tapering valve is equal in area to the opening at the smaller end of the valve plus the projected area of the ports to the plane of the base of the valve. In other words the opening at the larger end of the tapering valve is equal in area to the sum of the area of the opening at the smaller end of the valve and the projected area of the ports to the plane of the base of the valve.

The invention is not to be understood as being limited to the use of pressure devices for holding the balanced valve yieldingly to its seat, as the valve may be held yieldingly to its seat simply by gravity resulting from the weight of the valve, the cohesive attraction due to the lubricating oil and the slight end thrust of the diagonal gearing, or by slightly increasing the opening at the larger end of the valve and thus developing a slight unbalancing pressure on the valve in the direction of the valve seat.

Having thus described my invention I claim and desire to secure by Letters Patent:

1. In a valve mechanism for internal combustion engines, the combination with a cylinder and a piston working therein, of a tapering valve seat provided with inlet and exhaust passages, and a tapering rotary valve, consisting of a ring or annulus, open from top to bottom, fitting said seat and having diametrically opposite inlet and exhaust ports.

2. In a valve mechanism for internal combustion engines, the combination with a cylinder and a piston working therein, of a tapering valve seat located at one end of said cylinder and provided with inlet and exhaust passages, and a tapering rotary valve, consisting of a ring or annulus open from top to bottom, fitting said seat and having diametrically opposite inlet and exhaust ports.

3. In a valve mechanism for internal combustion engines, the combination with a cylinder and a piston working therein, of a tapering valve seat provided with inlet and exhaust passages, a tapering rotary valve, consisting of a ring or annulus, open from top to bottom, fitting within said seat and having inlet and exhaust ports and means for yieldingly pressing said valve to its tapering seat.

4. In a valve mechanism for internal combustion engines, the combination with a cylinder and a piston working therein, of a tapering valve seat provided with inlet and exhaust passages, a tapering rotary valve, consisting of a ring or annulus, open from top to bottom, fitting said seat and having diametrically opposite inlet and exhaust ports, and means for yieldingly pressing said valve to its tapering seat.

5. A balanced rotary valve, for internal combustion engines, consisting of a tapering ring or annulus open from top to bottom and provided at its sides with diametrically opposite inlet and exhaust ports of equal area.

6. A balanced tapering rotary valve, for internal combustion engines, consisting of a ring or annulus open at top and bottom and provided at its sides with inlet and exhaust ports, the opening at the larger end of the said tapering valve being equal in area to the sum of the area of the smaller end of the valve plus the projected area of the ports to the plane of the base of said valve.

7. A balanced tapering rotary valve for internal combustion engines, consisting of a ring or annulus open at top and bottom and provided at its sides with inlet and exhaust ports, the opening at the larger end of the said tapering valve being equal in area to the sum of the area of the smaller end of the valve plus the projected area of the ports to the plane of the base of said valve, combined with means for rotating said valve and for holding the same yieldingly to its seat.

8. In an internal combustion engine, the combination of a cylinder, a working piston, a ported valve seat having a surface whose generatrix intersects a line parallel to the axial line of said valve seat, a ported valve operatively fitted to said surface of said seat, said valve substantially encircling a combustion chamber and having an inner surface exposed to combustion pressure, the opposing unit areas of said inner surface being substantially equal when projected to any common plane.

9. In an internal combustion engine, the combination of a cylinder, a working piston, a ported valve seat having a surface whose generatrix intersects a line parallel to the axial line of said valve seat, a ported valve operatively fitted to said surface of said seat, said valve substantially encircling a combustion chamber and having an inner surface exposed to combustion pressure, the opposing unit areas of said inner surface being substantially equal when projected to any common plane, means for yieldingly holding said valve to said seat and means for operating said valve.

10. In an internal combustion engine, the combination of a cylinder, a working piston, a ported valve seat having a surface whose generatrix intersects a line parallel to the axial line of said valve seat, and a ported valve operatively fitted to said surface of said seat, said valve substantially encircling a combustion chamber and having an inner surface whose opposing unit areas are substantially equated with relation to combustion pressure.

11. In an internal combustion engine, the combination of a cylinder, a working piston, a ported valve seat having a surface whose generatrix intersects a line parallel to the axial line of said valve seat, a ported valve operatively fitted to said surface of said seat, said valve substantially encircling a combustion chamber and having an inner surface whose opposing unit areas are substantially equated with relation to combustion pressure, means for yieldingly holding said valve to said seat, and means for operating said valve.

In testimony whereof I affix my signature, in presence of two witnesses.

RALPH H. HEBERLING.

Witnesses:
J. E. MOORE,
D. W. MIDDLECAMP.